Aug. 23, 1938.  R. S. CARTER  2,128,119
FRONT WHEEL DRIVE FOR AUTOMOBILES
Filed Feb. 25, 1937  2 Sheets-Sheet 1
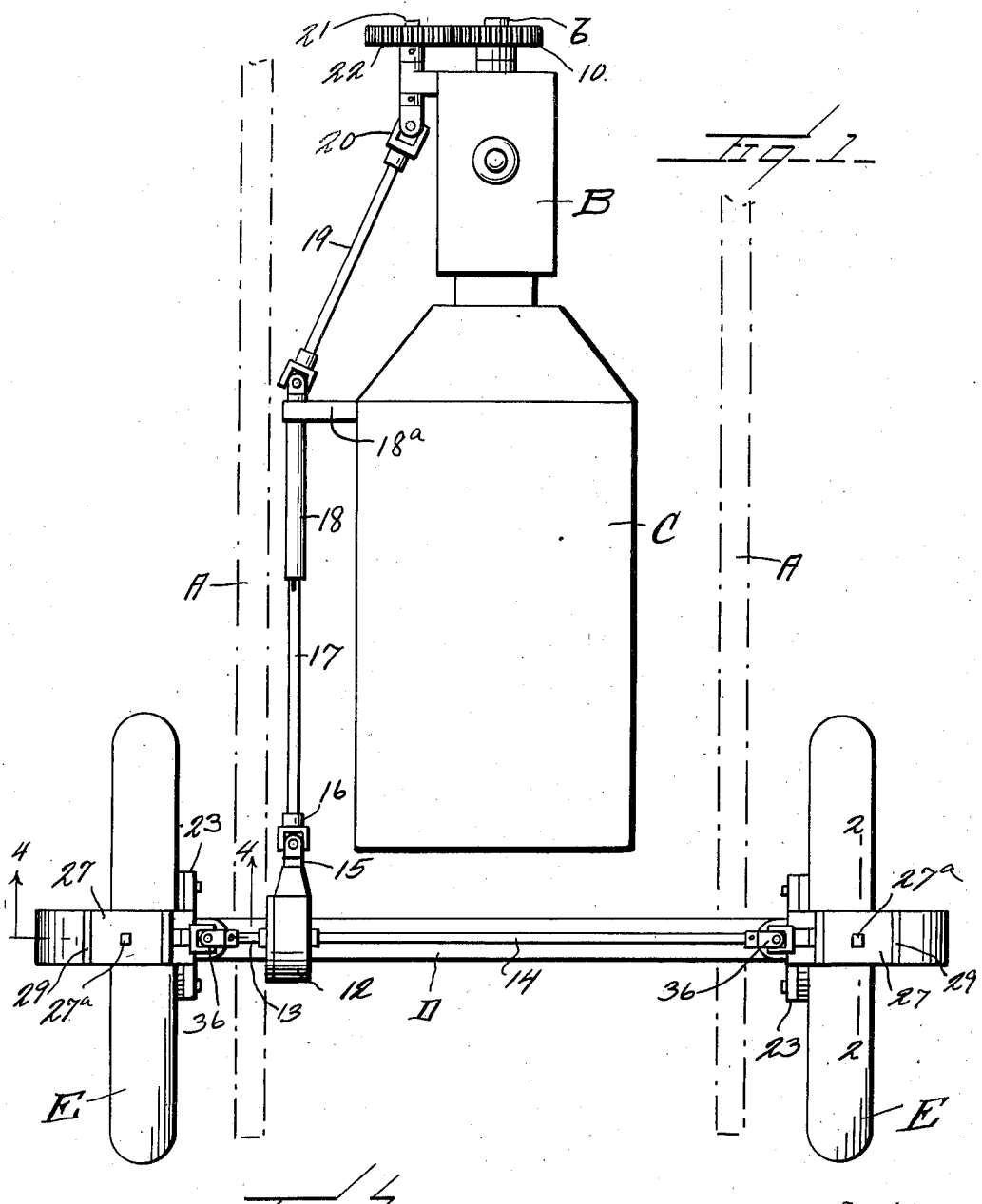
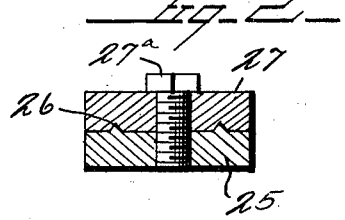
Inventor
R. S. Carter
By Watson E. Coleman
Attorney

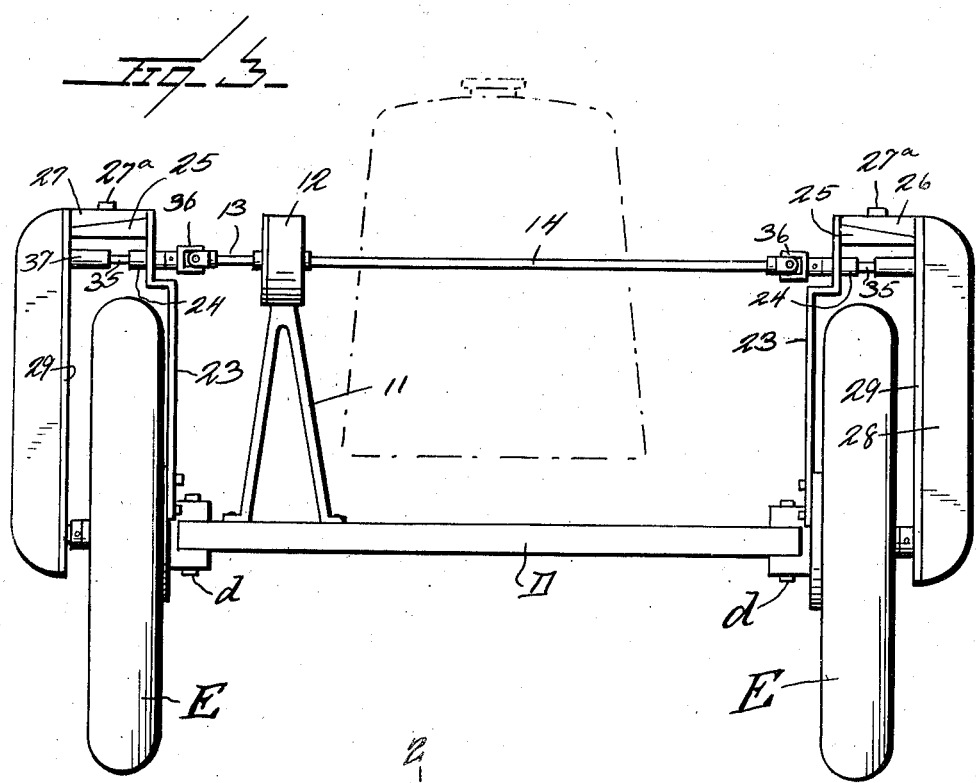

Patented Aug. 23, 1938

2,128,119

UNITED STATES PATENT OFFICE 2,128,119

FRONT WHEEL DRIVE FOR AUTOMOBILES

Richard S. Carter, Hutchinson, Kans.

Application February 25, 1937, Serial No. 127,733

6 Claims. (Cl. 180—43)

This invention relates to the driving mechanism of automotive vehicles and particularly to a front wheel drive therefor.

The main object of the invention is the provision of a simple mechanism whereby the front wheels of a car may be driven without interfering with the steering movement of the front wheels so that these front wheels will pull the load instead of the rear wheels pushing it, thus avoiding the great danger of skidding on curves or in wet weather.

Another object is to provide a mechanism of this character whereby the driving wheels will always be disposed at the same distance from the engine for cars of different lengths instead of being at varying distances from the engine, depending upon the length of the car or truck.

A further object is to provide a structure of this kind which will permit the body to be built close to the ground.

A still further object is to provide a driving mechanism of this kind, the main gearing of which is enclosed within a housing so that it may run in oil, and another object is to provide means whereby the housing containing this gearing may be detachably mounted upon a fender bracket to permit the front wheels to be removed from the axle and permit the new tires to be put in place or a spare substituted for a wheel, the tire of which has been punctured.

My invention is illustrated in the accompanying drawings wherein:

Figure 1 is a top plan view of an automotive vehicle with a front drive constructed in accordance with my invention.

Figure 2 is a section on the line 2—2 of Figure 4.

Figure 3 is a front elevation of a vehicle equipped with my front wheel drive.

Figure 4 is a vertical sectional view through a portion of the supporting bracket and the housing mounted thereon and showing in elevation the gearing whereby the front wheel is driven.

Referring to these drawings, A shows in dotted lines the chassis frame, which may be of any suitable construction. B designates the transmission casing and C the engine hood. These parts have been shown diagrammatically as they form no part of my invention. These parts are mounted on the chassis in any desired way. The shaft driven by the engine through the transmission is designated generally b and carries upon it a gear wheel 10. Mounted on a bracket 11 at the front of the automobile and resting upon the axle D thereof is a differential housing 12. Extending from one side of the differential housing is a shaft section 13 and extending from the other side is a relatively longer shaft section 14. Entering the differential housing is a shaft section 15 having a universal coupling 16 to a shaft section 17 which in turn has telescopic engagement with the tubular shaft section 18 shown as being supported at its rear end in a bracket 18a. Having a universal joint connection to this tubular shaft section 18 is an angular shaft section 19 which in turn has a universal joint connection 20 to a shaft 21 carrying a gear wheel 22 which engages the gear wheel 10. By this means power is transmitted from the engine to the shaft sections 13 and 14 which transmit power to the front wheels.

Mounted upon the spindles of the wheels E in any suitable manner and extending upward therefrom are the brackets 23. Each of these brackets adjacent its upper end is formed with a bearing 24, as shown in detail in Figure 4, and the upper end of each of these brackets is formed with an outstanding flange 25 beveled downward and outward and formed, as shown in Figure 2, with the upstanding ribs 26. Adapted to rest upon this flange 25 is an inwardly extending flange 27 of a housing designated generally 28. The flange 27 is shown as integrally engaged or formed with a downwardly extending web 29 (see particularly Figure 4), this web adjacent its lower end having a bearing 30 and adjacent its upper end having a bearing 31. Between these bearings there are the projecting bearing brackets 32 and 33. The outer face of the web 29 is flanged for the reception of an outer housing plate 34.

Disposed in the bearing 24 is a shaft section 35 which at its end confronting the differential casing 12 is formed with one member of a universal joint, the joint being designated 36, the other member of the universal joint being engaged with the shaft section 13, or with the outer end of the shaft section 14, as the case may be. In other words, both the shaft section 13 and the shaft section 14 are provided at their ends with universal couplings connecting each of these shaft sections with a shaft 35. The shaft 35 is inserted in a socket 37 carried by a shaft 38 extending through the bearing 31. The shaft 35 is splined or keyed within this socket 37 so that the shaft 35 has telescopic but rotative engagement with the shaft 38.

Mounted in the bearings 32 and 33 is a vertical shaft 39 carrying beveled pinions 40 at the upper and lower ends. The upper pinion 40 engages with a pinion 41 mounted on the shaft 38 while the lower pinion 40 engages with a beveled pinion 42 mounted upon a shaft 43 disposed within the bearing 30. This shaft carries upon it at its inner end an interiorly screw threaded head 44. The wheel is provided with a hub 45, the extremity of which is reduced and exteriorly threaded for engagement with the head 44. Means are provided for preventing any disengagement between the hub 45 and the head 44 due to a rotation of the wheel, and I have illustrated for this purpose a set screw 46, but it is to be understood that this is purely illustrative and any means may be used for holding the hub 45 and the head 44 in rotative engagement, said means permitting, however, the disengagement of the head 44 from the hub in order to permit the wheel to be taken off or a new wheel put in place or the removal of the tire. The interior of the housing 28 is intended to be filled with oil so that the gears enclosed within this housing will run in oil at all times.

The operation of this mechanism will be obvious from what has gone before.

While I have shown a plurality of shaft sections 17, 18 and 19 between the pinion 22 and the transversely extending driven shaft formed of the sections 13 and 14, yet obviously I do not wish to be limited to this as under some circumstances, a shaft might be extended directly from the gear wheel to a differential on the front shaft.

It will be noted that this construction does not interfere in any way with the shifting of the front wheels to steer the car. The universal connection 36 is disposed with its pivots immediately above the pivot d of the knuckle which supports the wheel E, so that the housing 28 and allied parts may turn with the wheel. It will be seen that the brackets 23 are mounted upon the spindle of the wheel so that these brackets turn with relation to the axle D as the wheels are turned. By removing the screw 27a, the housing 28 may be entirely removed, this being permitted by the slip joint between the shaft 35 and the socket 37 and by the removability of the head 44 from the hub 45. This permits the wheels to be removed or the tires changed. The differential is an ordinary type and, therefore, it is not believed necessary to illustrate it. Of course, the wheels will be provided with the ordinary steering gear.

While I have illustrated the bracket 18a as extending outward from the engine hood or allied parts, I do not wish to be limited to this as by connecting this bracket to the axle D, for instance, the universal joint 16 could be done away with. In other words, I do not wish to be limited to the exact connection shown between the differential shaft and the gear wheel 22, as this may be varied in many ways without departing from the spirit of the invention as defined in the appended claims. Obviously other minor changes might be made without departing from the invention as defined in said claims.

What is claimed is:—

1. In an automotive vehicle, a chassis, an engine thereon, a front axle, front steering wheels pivotally connected to the axle for transverse swinging movement, a differential supported upon the front axle, means for driving the differential from the engine, shaft sections extending in opposite directions from the differential and driven therefrom, short shaft sections having universal joint connection with the first named shaft sections, a hub extending outward on each wheel, a train of gears disposed outward of the wheel and operatively connecting each short shaft sections to the corresponding wheel hub, and a housing supporting and enclosing said train of gears said housing and gearings enclosed therein being removable as a unit from the chassis and corresponding wheel.

2. In an automotive vehicle, a chassis, an engine thereon, a front axle, front steering wheels, spindles therefor pivoted to the front axle, a bracket extending up from each spindle, a differential mounted upon the front axle opposite the upper end of the bracket, means providing a driving connection between the engine and said differential, shaft sections extending in opposite directions from the differential, short shaft sections mounted in said brackets and having universal joint connections to the first named shaft sections, the pivots of said connections being disposed in alinement with the pivotal connections of the spindles to the axle, a hub on each wheel, a housing detachably connected to said bracket and extending downward exteriorly of each wheel, a short shaft section at the lower end of the housing having detachable rotative engagement with the hub of the corresponding wheel, and a train of gears disposed within the housing and affording driving engagement between the first named short shaft section and the last named short shaft section.

3. In an automotive vehicle, a chassis, an engine thereon, a front axle, front steering wheels spindles carrying the wheels and pivoted to the front axle, a bracket extending up from the spindle of each steering wheel, a differential mounted upon the front axle opposite the upper end of the bracket, means providing a driving connection between the engine and said differential, shaft sections extending in opposite directions from the differential, short shaft sections mounted in said brackets and having universal joint connections to the first named shaft sections, the pivots of said connections being disposed in alinement with the pivotal connections of the spindles to the axle, a hub on each wheel, a housing detachably connected to said bracket and extending downward exteriorly of each wheel, a short shaft section at the lower end of the housing having detachable rotative engagement with the hub of the corresponding wheel, a train of gears disposed within the housing and affording driving engagement between the first named short shaft section and the last named short shaft section, said train including a vertical shaft having beveled gear wheels thereon, and beveled gear wheels mounted on said short shaft sections and engaging the first named beveled gears.

4. In an automotive vehicle, a chassis, an engine thereon, a front axle, front steering wheels pivoted to the front axle, a bracket extending up from the central portion of each steering wheel and having a laterally extending flange, a differential mounted upon the front axle opposite the upper end of the bracket, means providing the driving connection between the engine and said differential, shaft sections extending in opposite directions from the differential, short shaft sections mounted in said brackets and having universal joint connection to the first named shaft sections, the pivots of said connections being disposed in alinement with the pivotal connections of the wheels to the axle, a hub on each wheel, a housing associated with each bracket, the housing having an inwardly projecting flange overlying the flange on the corresponding bracket and detachably engaged therewith, the housing having a web extending downward exteriorly of the corresponding wheel, a short shaft section mounted in the upper portion of the housing and having sliding rotative engagement with the shaft section on the upper portion of the bracket, a short shaft section mounted in the lower end of the web of the housing and having detachable rotative engagement with the hub of the wheel, and gearing within the housing transmitting the motion of the first named short shaft section to the last named short shaft section.

5. In an automotive vehicle, a chassis, an engine thereon, a front axle and front steering wheels, wheel spindles pivoted for steering movement upon the front axle, transversely extending shaft sections disposed parallel with the axle, means for driving said sections from the engine, outwardly projecting hubs on the steering wheels, a shaft section at the outer end of each of the first named shaft sections and having a universal joint connection thereto, and a train of gears removably supported as a unit on each of said spindles and disposed outward of the corresponding wheel, one of said gears being operatively connected to the corresponding last named shaft sections and another gear having detachable rotative engagement with the hub of the wheel.

6. In an automotive vehicle, a chassis, an engine thereon, a front axle, front steering wheels and wheel spindles pivoted for steering movement upon the front axle, housings detachably supported upon the wheel spindles and disposed outward of the wheels, each housing having gearing therein and carried thereby, said gearing detachably engaging the corresponding steering wheel, and means for driving the gearing within said housings.

RICHARD S. CARTER.